Feb. 25, 1964

C. E. ANDERSON ETAL 3,122,352

SPHERICAL PLUG VALVE HAVING PRESSURIZED SEATS
INCLUDING BODY PRESSURE RELIEF MEANS

Filed July 10, 1961

Clifford E. Anderson
Joseph T. Stewart, Jr.
INVENTORS

BY Russell E. Schloff
ATTORNEY

United States Patent Office 3,122,352
Patented Feb. 25, 1964

3,122,352
SPHERICAL PLUG VALVE HAVING PRESSURIZED SEATS INCLUDING BODY PRESSURE RELIEF MEANS
Clifford E. Anderson and Joseph T. Stewart, Jr., Houston, Tex., assignors to ACF Industries, Incorporated, New York, N.Y., a corporation of New Jersey
Filed July 10, 1961, Ser. No. 122,963
16 Claims. (Cl. 251—172)

This invention relates to a top entry, trunnioned, spherical plug valve having pressure actuated seats.

Pipelines measuring from 6" to 36" in diameter and having internal pressures from 200 to 1500 p.s.i. are utilized to carry numerous petroleum products. In order to keep the interior wall of the pipeline clean, the pipeline is periodically "pigged," that is, an object approximately the same size as the original inside diameter of the pipe is sent through the line to cut out all foreign matter. Accordingly, through conduit gate valves or full bore plug valves are customarily used for pipeline service. Since the valve member must have a portion which contains a through passage as well as a portion which establishes the seal, a through conduit gate valve is quite large in size. As plug valves are generally tapered, the overall body of a full bore tapered plug valve is also quite large. Valves having large bodies require large supporting structures and if installed in a compressor station or other building often increase the size of the building. The through conduit valve having the smallest body is the spherical plug valve and it is to the adaptation of the spherical plug valve for pipeline service that the present invention is particularly directed.

Large valves because of their size, and other valves along the pipeline because of their location, are usually provided with some type of automatic operator which is oftentimes controlled from a remote location. The size of the operator depends on the amount of force required to move the valve from one position to another. As a rule, to a large extent the cost of an operator is directly proportional to the size of the operator; therefore, one of the objectives for the present valve was to have a minimum torque requirement.

Other objectives for the present valve were to provide a spherical plug valve that could be repaired without having to remove the valve from the line, to provide operative upstream and downstream seats, to provide an automatic relief which would relieve any excessive body pressure, and to utilize a resilient insert valve seat which would not be cut out during operation. In order to accomplish all of these various objectives, a top entry spherical plug valve having a trunnioned valve member and pressure actuated seats was developed.

The top entry design permits repair while the valve remains in the line. The trunnioning of the valve member retains the valve member stationary preventing differential pressure against the downstream seat which results from a floating valve member, consequently torque necessary to operate the valve is markedly reduced. The pressure actuated seats permit one seat to be used during normal operation of the valve, but upon failure of the normally operated seat permits the other seat to come into play and also permits the valve to be used for block and bleed service. The pressure actuated seats also facilitate the provision of an automatic built-in relief which bleeds any excess pressure off into the upstream side thereby preventing rupture of the body due to excess body pressure.

The valve of the present invention has an open-ended valve chamber with a pair of axially aligned flow passages extending into and communicating with the central valve chamber and forming seat pads. A rotatable valve member having generally spherical sealing surfaces and two axially aligned stems is positioned in the valve chamber. One stem is journaled in the base of the chamber and the other stem extends through and is journaled in a bonnet which closes the opening of the valve chamber. The bonnet is provided with a novel packing box which aids in maintaining a low torque. The valve member has a passage which in the open position is aligned with the flow passages. The valve has a pair of pressure actuated seat members, one seat member being poistioned between the valve member and each seat pad. Each seat member is made up of an annular retainer ring which encompasses a portion of the spherical valve member. The face of the seat member opposing the spherical surface of the valve member is provided with an insert of resilient plastic material which extends slightly above the surface of the face and provides in effect the sealing area for the seat. A novel means of retaining the insert is provided so that it will not be blown out during operation of the valve. The face of the seat opposing the seat pad is generally flat and is provided with an annular groove in which is positioned a piston having seals with the peripheral walls of the groove. Spring means positioned between the bottom of the groove and the piston provides initial interference between the seat and the spherical surface of the valve member. There is an annular groove in the wall of the piston which opposes the extension. Positioned in said grooves is an O-ring which establishes a seal between the seat and the end of the extension. The groove has an enlarged portion which is provided with a bushing having a central passage to the back of the piston. Pressure from either direction will push the O-ring across the bushing and pressure will be transmitted through the aperture causing the seat member to be pressure acting. On the upstream side, when the body pressure exceeds certain limits the O-ring will move against the bushing and automatically dump the excess pressure into the upstream line.

It is the primary object of the present invention to provide a top entry spherical plug valve for pipeline service having a trunnioned valve member and pressure-actuated seats.

It is another object to provide a spherical plug valve with a seat member having a resilient seat insert retained in a novel positive manner.

It is another object to provide a top entry spherical plug valve with a trunnioned valve member, two pressure-actuated seats and automatic body relief to the upstream side.

It is a further object to provide a top entry spherical plug valve having pressure actuated seats and requiring a minimum amount of torque for operation.

Still a further object is to provide a top entry spherical plug valve having a trunnioned valve member with pressure-actuated seats having plastic resilient inserts acting as seal members in which the inserts are retained in a novel positive manner.

Still a further object is to provide a spherical plug valve in which the seat members are pressure actuated by a piston action within the seat members themselves.

Still a further object is to provide a top entry, trunnioned, spherical plug valve having a novel packing box which aids in maintaining a low torque.

Other and further objects of the invention will be obvious upon an understanding of the illustrative embodiments about to be described, or will be indicated in the appended claims, and various advantages not referred to herein will occur to one skilled in the art upon employment of the invention in practice.

Referring now to the drawings, the spherical plug valve of the present invention is comprised of a body 10 having a centrally located, open-ended valve chamber 12. The base of the chamber 12 is provided with a centrally located boss 14 having a bore 16. A pair of axially aligned flow passages 18—18 communicate with the valve chamber 12. Each passage 18 has a hub portion which extends into the valve chamber 12. The ends of the hub portions present a pair of spaced, parallel, flat seat pads 20—20. The outer end of each passage 18 may be provided with a flange, screwed end, or any other type of construction desired to connect the valve to a flow system, as is well known in the art.

Positioned in the valve chamber 12 is a rotatable valve member 22 having generally spherical sealing surfaces 24—24 and a passage 26 which in the open position aligns with the flow passages 18—18. The valve member 22 has two axially aligned stems 28—30. Stem 28 is journaled in the bore 16 of the centrally located boss 14. A roller bearing 32 may be utilized between the stem 28 and the bore 16 to permit easier turning of the stem 28. The bearing 32 also aids in maintaining the valve member 22 in alignment and prevents any floating movement thereof. In order to lubricate the bearing 32, a passage 34 extends from the bearing pocket to the outside of the body 10 where it is provided with a lubricant fitting 36 which permits the introduction of lubricant to the bearing 32.

Located in the valve chamber 12 between the valve member 22 and each seat pad 20 are seat members 38—38. In order to install the seat members 38—38, they are placed about the spherical valve member 22 and the assembly inserted into the valve chamber 12 between the seat pads 20—20. If desired, centering pins 40 may be provided. As seen in the drawings, there may be two pins on each side of the seat 38 and the pins 40 are adjustable so each seat 38 may be properly aligned and retained in position.

The seat members 38—38 are pressure acting, that is, the seat members seal in response to line pressure and in effect the higher the line pressure the tighter the seal. Having pressure-actuated seats results in several practical advantages, i.e., tolerance between the seat pads 20—20 can be increased thereby cutting down on manufacturing costs, the valve can normally operate on the downstream seat; but if the downstream seat fails or the body is bled for block and bleed service, the upstream seat will take over and function. This provides a safety factor as well as permitting block and bleed service.

Each seat member 38 is comprised of an annular seat retainer ring 42 having an inner diameter permitting it to encompass a portion of the spherical sealing surfaces 24—24 of the spherical valve member 22. The seat retainer ring 42 has a bore 44 which co-operates with the flow passages 18—18 and passage 26 in valve member 22 to form the run of the valve. The front face 46 of the retainer ring 38 opposing the spherical sealing surface 24 is frusto conical and located therein is an annular groove 48 having an axis parallel with the axis of the retainer ring 42. Positioned in the groove 48 is an insert 50 formed of a resilient plastic material which is capable of flowing into and forming a seal with minor surface irregularities. The insert 50 extends slightly above the surface of the frusto conical face 46 and is in effect the sealing surface for the seat 38. It has been found that polytetrafluoroethylene, sold under the trademark "Teflon," makes a very desirable insert since it has an exceedingly low coefficient of friction and is inert to most ladings. The Teflon can be either virgin, filled with glass, or other fillers which will increase its load bearing characteristics.

Figure 1:
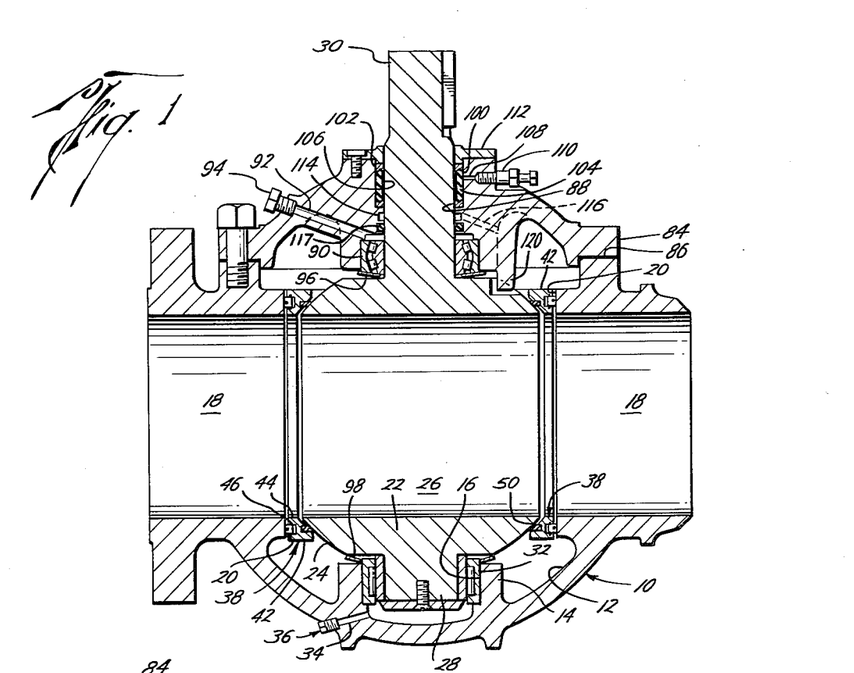
FIG. 1 is a vertical section of the valve of the present invention.
Figure 2:
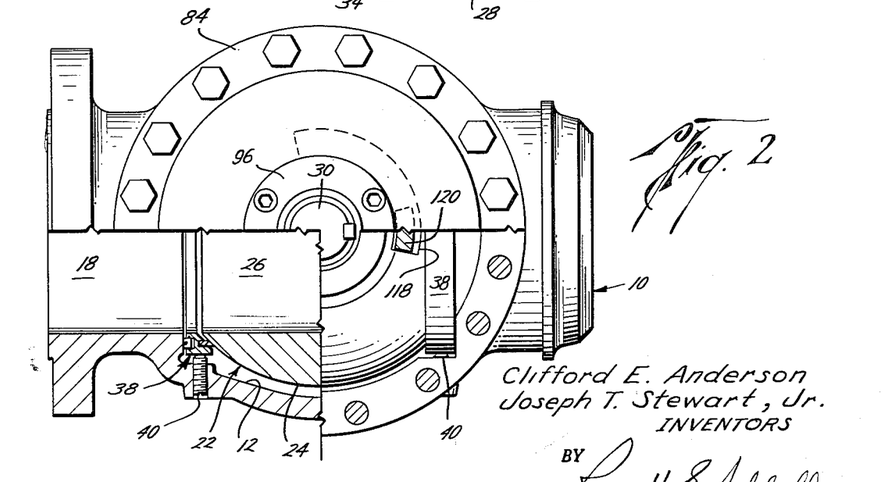
FIG. 2 is a top view of the valve partially in section.
Figure 3:
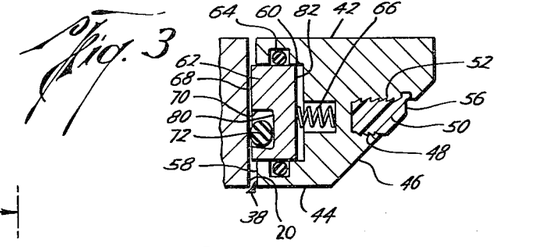
FIG. 3 is an enlarged sectional view of the seat utilized in the valve.
Figure 4:
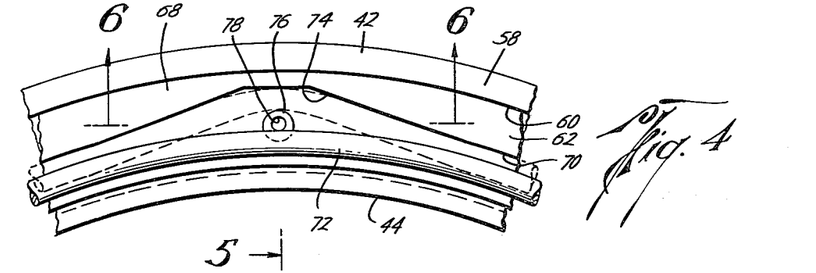
FIG. 4 is a fragmentary plan view of a portion of the back face of the seat showing how the O-ring is positioned on one side or other of the bushing to permit pressure to reach the piston cavity.
Figure 5:
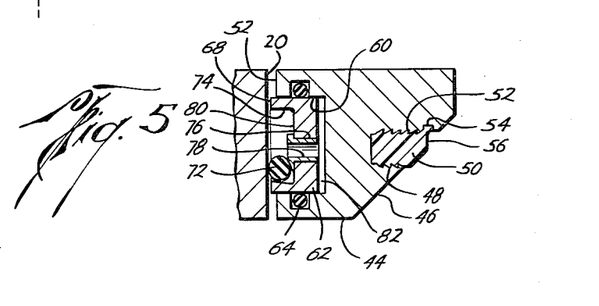
FIG. 5 is a sectional view taken generally on lines 5—5 of FIG. 4.

In order to prevent the insert 50 from being dislodged from the groove 48 by flow of fluid past the insert when the insert 50 is unsupported by the spherical surface 24 of the valve member 22 during the operation of the valve, a novel insert retaining means is used. The peripheral walls of the groove 48 are provided with a series of buttress thread serrations 52 as can be seen in FIGS. 3 and 4. The configuration of these serrations is such that while the insert 50 may rather easily be pushed into the groove 48 under pressure and heat application, it is most difficult for the insert 50 to come back out. It has been found that the buttress thread serrations 52 have excellent holding characteristics since they form a barbed or fish hook effect which resists movement out of the groove 48. The buttress thread serrations 52 hold the material forming the insert 50 so well that the force required to blow out the material becomes solely dependent upon the shear strength of the material forming the insert. Adjacent the top of the groove of the higher of the two peripheral walls there is a pocket 54 which is deeper than the buttress thread serrations 52. The insert 50 instead of having a straight face from one edge of the groove to the other is relieved at its higher edge to present a flat surface 56 which is located opposite the pocket 54. Having the flat surface 56, the dynamic force of the fluid flowing past the seat will hit the flat 56 rather than a sharp edge with the net effect tending to force the resilient material forming the seat into the groove rather than out of it. Also, an entry lip is eliminated so that it can not be forced into the passage 26 of the valve member 22 and thus subject the material forming the insert to tearing action. As the insert 50 wears, it can roll into the groove rather than flowing out with the frusto conical surface 46 where it could be pinched off.

The annular seat retainer ring 34 has a flat back face 58 which opposes and mates with the seat pad 20. An annular groove 60 is located in the generally flat surface 58. Positioned in and co-operating with the back face groove 60 is an annular, cylindrical position 62. Located in the outer and inner peripheral walls of the back face groove 60 are grooves in which are located O-rings 64—64 which establish seals with the peripheral cylindrical walls of the piston 62. A multiplicity of blind holes are located in the bottom wall of the back face groove 60 in which are located springs 66 which provide the initial force to move the seat 32 into sealing contact with the seat pad 20 and the spherical face 24 of the valve member 22. The springs 66 also aid in the installation of the valve member-seat assembly into the valve chamber 12 since the springs can be compressed during assembly. The springs also permit some loosening of manufacturing tolerances since they permit the valve member-seat assembly to expand or contract within limits which permits considerable variation in the distance between seat pads 20—20. The end wall 68 of the piston 62, which opposes the seat pad 20, is provided with an annular groove 70 in which is positioned an O-ring 72. The piston groove 70 has an enlarged portion 74 (see FIG. 4) in which is located a bushing 76 extending above the surface of the bottom wall of the piston groove 70. The bushing 76 has an aperture 78 communicating with the bottom wall 80 of the back face groove 60 in the seat retainer ring 42. When the O-ring 72 in the piston groove 70 of the piston 62 is on either side of the bushing 76, pressure will flow through the aperture 78 and into the sealed cavity 82 formed by the cylindrical piston 62 co-operating with the back face groove 60. Although pressure will also flow to the face of the seat 22, the inner diametrical wall of the cavity 82 is closer to the bore 44 than the insert 50 which effects the seal; therefore, the net effect will be for the pressure in the cavity 82 to cause the seat to increase in overall length causing the insert 50 to more tightly contact the spherical surface 24 of the valve member which it opposes. Also, the area acted on by the pressure in the cavity 82 is greater than the area acted on by pressure at the back 58 of the seat, therefore the pressure will always be tending to keep the back of the seat in sealing contact with the seat pad 20. This action takes place on the downstream side due to body pressure, and on the upstream side due to upstream line pressure. On the downstream, the O-ring 72 will normally be located on the bore side of the bushing 76. On the upstream side, the line pressure will normally cause the O-ring 72 to move over the bushing 76 positioning the O-ring 72 on the side of the bushing 76 closest to the periphery of the retainer ring 42. In either case, pressure from the body or line pressure can flow through the aperture 78 into the cavity 82 actuating the piston 62 thereby extending the axial length of the seat and forcing the face of the seat 32 into intimate contact with the spherical surface 24 of the valve member, and the back 58 of the seat member into sealing contact with the seat pad 20. After a valve has been in the line and has become oriented, it has been found that both seats will function. The downstream seat will function as a result of pressure in the body and the upstream seat will function as a result of line pressure.

While it has been found desirable to locate the piston 62 in the back portion of the seat retainer ring 42, it is possible to have the piston in the face in which case the face of the piston would be frusto conical and contain the sealing insert.

Figure 6:
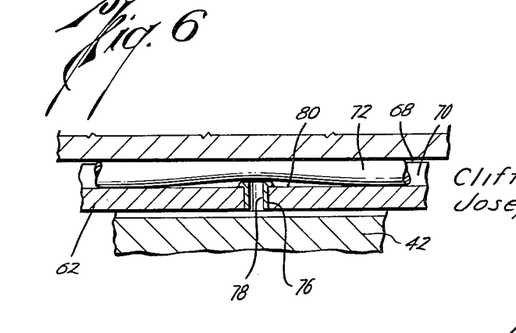
FIG. 6 is a sectional view taken generally on line 6—6 of FIG. 4 to show how the O-ring looses contact with the surface when the O-ring contacts the bushing.

If body pressure builds up excessively through a rise in temperature, etc., the gradual increase will act on the section of O-ring 72 in the enlarged portion 74 and cause the O-ring 72 to gradually move across the bushing 76. As the O-ring 72 moves across the bushing 76, the O-ring 72 will loose contact with the surface 80 of the groove 70 (see FIG. 6) and fluid will flow into the upstream line which will be at a lower pressure thereby relieving the excessive pressure in the valve chamber and prevent pressure lock and possible rupture of the valve body. This relief will function automatically and will prevent gradual build-up of excessive pressure which could cause damage to the body 10.

Closing the open end of the valve chamber 12 is a bonnet 84. As shown, the bonnet 84 has a flange which is provided with a plurality of apertures. The body is provided with mating threaded apertures and threaded members attach the bonnet 84 to the body 10. To establish a seal for the opening, a gasket 86 is placed between the flange of the bonnet 84 and the wall of the body 10 to which the bonnet 84 is attached. The bonnet 84 is provided with a centrally located passage 88 through which the stem 30 extends.

The inner end of the passage 88 is enlarged to receive a spherical roller bearing 90 in which the stem 30 is journaled. The bearing 90 permits the stem 30 to turn easier and also aids in alignment and stablization of the valve member 22. The bearing 90 is also designed to carry the load resulting from the upward thrust of the valve member. In order to lubricate the bearing 90, a drilled passage 92 extends from the bearing pocket to the surface of the bonnet 84. The outer end of the passage 92 is closed by a lubricant fitting 94 which permits the injection of lubricant to the bearing 90. To prevent the lubricant used to lubricate the bearings 32 and 90 from comingling with and contaminating the lading flowing through the valve, it may be desirable to form a reservoir for the lubricant of the bearings. This can be accomplished by placing a Belleville-like rubber washer 96 between the bearing 90 and the top of the spherical valve member 22. The washer 96 is so designed that if the lubricant pressure exceeds the pressure in the valve, the lubricant pressure will be relieved; and if the pressure in the valve increases, the seal of the washer 96 is forced aside so that pressure may again be balanced. A similar washer 98 may be inserted between the top of the boss 14 and bearing 32 to form a lubricant reservoir for the bearing 32.

The axially outer end of the passage 88 is enlarged to provide a packing box 100 for the stem 30. The packing box 100 is made up of upper and lower packing rings 102 between which is located replenishable plastic packing 104. To permit easier turning, a sleeve 106 of a material having a low coefficient of friction is placed around the stem 30 in the area of the plastic packing 106. To permit replenishing of the packing 104, there is a passage 108 extending from the packing 104 to the surface of the bonnet where it is closed by a packing fitting 110. Closing the end of packing box 100 is a plate 112 which is secured to the end of the bonnet 84. To prevent packing 104 from reaching the bearing 90 and contaminating the lubricant and fouling the bearing, an annular groove 114 is located in the passage 88 which will receive any excessive packing. Leading from the groove 114 to the valve chamber 12 is a passage 116 through which the excessive packing 104 can flow. To further aid in retaining the excessive packing, a second groove is located in the passage 88 in which is located an O-ring 117 which by O-ring action will stop flow of excessive packing and in effect direct it to the groove 114 and passage 116 to the valve chamber 12.

Since the valve will be made in large sizes and rotated by automatic operators, the valve is provided with an internal stop which can be made very strong. As can be seen in the drawings, the top surface of the valve member 22 is provided with a cut-out portion 118 for approximately 90 degrees. This groove co-operates with an abutment 120 located in the bonnet 84 and limits movement between the open and closed position of the valve.

As can be seen from the foregoing, the spherical plug valve of the present invention is so designed that if any repairs are ever necessary they can be made while the valve is in the line. To make repairs, the bonnet 84 is removed and all of the working parts, valve member 22 and seats 38—38 are exposed. The valve member and seats can be removed and either repaired or replaced. Moreover, the operating torque of the valve is maintained at a minimum since the valve member 22 is trunnioned and will not float as a result of line pressure against the downstream seat; therefore, the only drag will be that caused by the pressure from the upstream seat and there will be no drag caused by the valve member acting on the downstream seat. Also, the valve has pressure acting seats which are responsive to either upstream or body pressure and will permit block and bleed service and also automatic pressure relief to the upstream side. In addition, the resilient insert is retained by novel means which will keep the insert retained even in the period when it is unsupported during valve operation. Further, the stem packing is so designed that the packing used will not contaminate the top bearing.

From the foregoing it will be seen that this invention is one well adapted to attain all of the objects hereinabove set forth, together with other advantages which are obvious and inherent from the description and the apparatus itself.

It will be understood that certain features and sub-combinations are of utility and may be employed without reference to other features and sub-combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:
1. A spherical plug valve comprising:
A. a body having:
(1) an open ended centrally located valve chamber with the wall of the chamber opposite the open end provided with a centrally located boss having a bore,
(2) a pair of axially aligned flow passages communicating with the valve chamber and terminating in parallel spaced seat pads;
B. a rotatable valve member positioned in said valve chamber having generally spherical sealing surfaces, a passage which in the open position is aligned with the flow passages, and two axially aligned stems with one stem journaled in the bore of the centrally located boss and the other stem extending through and past the opening of the valve chamber;
C. a pair of seat members, one positioned between the valve member and each seat pad, each seat member comprised of an annular retainer ring encompassing a portion of the spherical sealing surfaces of the valve member and having:
(1) a frusto conical surface forming the front face opposing the valve member,
(a) an annular groove having its axis parallel with the axis of the seat member in the frusto conical surface,
(b) buttress thread serrations in the inner and outer peripheral walls of the face groove,
(c) an insert of resilient plastic material positioned in said groove and locked therein by the serrations, said insert extending above the plane of the frusto conical surface to form the sealing face,
(2) a flat surface forming the back face opposing the seat pad,
(3) an annular groove in the generally flat surface, an annular piston positioned in said annular groove,
(4) grooves in the inner and outer peripheral walls of the back face groove, an O-ring positioned in each of said peripheral wall grooves to establish a seal between the piston and the peripheral walls of the back face groove,
(5) a multiplicity of blind holes in the bottom wall of the back face groove, springs positioned in said blind holes to provide initial energy to force the seat member into contact with the seat pad and the spherical face of the valve member,
(6) an annular groove in the wall of the piston opposing the seat pad, an O-ring in said piston groove, the piston groove having one enlarged portion, an aperture generally centrally located in said enlarged portion, a bushing in said aperture, said bushing extending above the bottom wall of the piston groove and having a passage communicating with the back face groove whereby when the O-ring in the groove of the piston is on either side of the bushing pressure will flow through the aperture and cause the seat member to be pressure acting but when the pressure in the valve chamber exceeds certain limits the O-ring will move against the bushing and dump the excessive pressure into the upstream line;
D. a bonnet secured about the opening of the valve chamber, the bonnet having a sealed passage in which the stem extending through the opening is journaled.
2. A spherical plug valve comprising:
A. a body having:
(1) an open ended centrally located valve chamber with the wall of the chamber opposite the open end provided with a centrally located boss having a bore,
(2) a pair of axially aligned flow passages communicating with the valve chamber and terminating in parallel spaced seat pads;
B. a rotatable valve member positioned in said valve chamber having generally spherical sealing surfaces, a passage which in the open position is aligned with the flow passages, and two axially aligned stems with one stem journalled in the bore of the centrally located boss and the other stem extending through and past the opening of the valve chamber;
C. a pair of seat members, one positioned between the valve member and each seat pad, each seat member comprised of an annular retainer ring encompassing a portion of the spherical sealing surfaces of the valve member and having:
(1) a frusto conical surface forming the front face opposing the valve member,
(2) an annular groove having its axis parallel with the axis of the seat member in the frusto conical surface, an insert of resilient plastic material positioned in said groove and extending above the plane of the frusto conical surface to form the sealing face,
(3) a flat surface forming the back face opposing the seat pad,
(4) an annular groove in the generally flat surface, an annular piston positioned in said annular groove,
(5) grooves in the inner and outer peripheral walls of the back face groove, an O-ring positioned in each of said peripheral wall grooves to establish a seal between the piston and the peripheral walls of the back face groove,
(6) a multiplicity of blind holes in the bottom wall of the back face groove, springs positioned in said blind holes to provide initial energy to force the seat member into contact with the seat pad and the spherical face of the valve member,
(7) an annular groove in the wall of the piston opposing the seat pad, an O-ring in said piston groove, the piston groove having one enlarged portion, an aperture generally centrally located in said enlarged portion, a bushing in said aperture, said bushing extending above the bottom wall of the piston groove and having a passage communicating with the back face groove whereby when the O-ring in the groove of the piston is one side of the bushing pressure will flow through the aperture and cause the seat member to be pressure acting but when the pressure in the valve chamber exceeds certain limits the O-ring will move against the bushing and dump the excessive pressure into the upstream line;
D. a bonnet secured about the opening of the valve chamber, the bonnet having a sealed passage in which the stem extending through the opening is journaled.
3. A spherical plug valve comprising:
A. a body having:
(1) an open ended centrally located valve chamber with the wall of the chamber opposite the open end provided with a centrally located boss having a bore,
(2) a pair of axially aligned flow passages communicating with the valve chamber and terminating in parallel spaced seat pads;
B. a rotatable valve member positioned in said valve chamber having generally spherical sealing surfaces, a passage which in the open position is aligned with the flow passages, and two axially aligned stems with one stem journaled in the bore of the centrally located boss and the other stem extending through and past the opening of the valve chamber;
C. a pair of seat members, one positioned between the valve member and each seat pad, each seat member comprised of an annular retainer ring encom- passing a portion of the spherical sealing surfaces of the valve member and having:
(1) a frusto conical surface forming the front face opposing the valve member,
(2) an annular groove having its axis parallel with the axis of the seat member in the frusto conical surface, an insert of resilient plastic material positioned in said groove and extending above the plane of the frusto conical surface to form the sealing face,
(3) a flat surface forming the back face opposing the seat pad,
(4) an annular groove in the generally flat surface, an annular piston positioned in said annular groove,
(5) grooves in the inner and outer peripheral walls of the back face groove, an O-ring positioned in each of said peripheral wall grooves to establish a seal between the piston and the peripheral walls of the back face groove,
(6) springs positioned between the back face groove and piston to provide initial energy to force the seat member into contact with the seat pad and the spherical face of the valve member,
(7) an annular groove in the wall of the piston opposing the seat pad, an O-ring in said piston groove, the piston groove having one enlarged portion, an aperture generally centrally located in said enlarged portion, a bushing in said aperture, said bushing extending above the bottom wall of the piston groove and having a passage communicating with the back face groove whereby when the O-ring in the groove of the piston is on one side of the bushing pressure will flow through the aperture and cause the seat member to be pressure acting but when the pressure in the valve chamber exceeds certain limits the O-ring will move against the bushing and dump the excessive pressure into the upstream line;
D. a bonnet secured about the opening of the valve chamber, the bonnet having a sealed passage in which the stem extending through the opening is journaled.

4. A spherical plug valve comprising:
A. a body having:
(1) an open ended centrally located valve chamber with the wall of the chamber opposite the open end provided with a centrally located boss having a bore,
(2) a pair of axially aligned flow passages communicating with the valve chamber and terminating in parallel spaced seat pads;
B. a rotatable valve member positioned in said valve chamber having generally spherical sealing surfaces, a passage which in the open position is aligned with the flow passages, and two axially aligned stems with one stem journaled in the bore of the centrally located boss and the other stem extending through and past the opening of the valve chamber;
C. a pair of seat members, one positioned between the valve member and each seat pad, each seat member comprised of an annular retainer ring encompassing a portion of the spherical sealing surfaces of the valve member and having:
(1) a frusto conical surface forming the front face opposing the valve member,
(2) an annular groove having its axis parallel with the axis of the seat member in the frusto conical surface, an insert of resilient plastic material positioned in said groove and extending above the plane of the frusto conical surface to form the sealing face,
(3) a flat surface forming the back face opposing the seat pad,
(4) an annular groove in the generally flat surface, an annular piston positioned in said annular groove,
(5) means establishing a seal between the piston and the peripheral walls of the back face groove,
(6) springs positioned between the back face groove and piston to provide initial energy to force the seat member into contact with the seat pad and the spherical face of the valve member,
(7) an annular groove in the wall of the piston opposing the seat pad, an O-ring in said piston groove, the piston groove having one enlarged portion, an aperture generally centrally located in said enlarged portion, a bushing in said aperture, said bushing extending above the bottom wall of the piston groove and having a passage communicating with the back face groove whereby when the O-ring in the groove of the piston is on one side of the bushing pressure will flow through the aperture and cause the seat member to be pressure acting but when the pressure in the valve chamber exceeds certain limits the O-ring will move against the bushing and dump the excessive pressure into the upstream line;
D. a bonnet secured about the opening of the valve chamber, the bonnet having a sealed passage in which the stem extending through the opening is journaled.

5. A spherical plug valve comprising:
A. a body having:
(1) an open ended centrally located valve chamber with the wall of the chamber opposite the open end provided with a centrally located boss having a bore,
(2) a pair of axially aligned flow passages communicating with the valve chamber and terminating in parallel spaced seat pads;
B. a rotatable valve member positioned in said valve chamber having generally spherical sealing surfaces, a passage which in the open position is aligned with the flow passages, and two axially aligned stems with one stem journaled in the bore of the centrally located boss and the other stem extending through and past the opening of the valve chamber;
C. a pair of seat members, one positioned between the valve member and each seat pad, each seat member comprised of an annular retainer ring encompassing a portion of the spherical sealing surfaces of the valve member and having:
(1) a frusto conical surface forming the front face opposing the valve member,
(2) an insert of resilient plastic material positioned in said frusto conical surface, said insert extending above the plane of the frusto conical surface to form the sealing face,
(3) a flat surface forming the back face opposing the seat pad,
(4) an annular groove in the generally flat surface, an annular piston positioned in said annular groove,
(5) means establishing a seal between the piston and the peripheral walls of the back face groove,
(6) means positioned between the back face groove and piston to provide initial force to force the seat member into contact with the seat pad and the spherical face of the valve member,
(7) an annular groove in the wall of the piston opposing the seat pad, an O-ring in said piston groove, the piston groove having one enlarged portion, an aperture generally centrally located in said enlarged portion, a bushing in said aperture, said bushing having a passage communicating with the back face groove whereby when the O-ring in the groove of the piston is on either side of the bushing pressure will flow through the aperture and cause the seat member to be pressure acting, but when the pressure in the valve chamber exceeds certain limits the O-ring will move against the bushing and dump the excessive pressure into the upstream line;

D. a bonnet secured about the opening of the valve chamber, the bonnet having a sealed passage through which the stem extending through the opening is journaled.

6. A spherical plug valve comprising:
A. a body having:
(1) an open ended centrally located valve chamber with the wall of the chamber opposite the open end provided with a centrally located boss having a bore,
(2) a pair of axially aligned flow passages communicating with the valve chamber and terminating in parallel spaced seat pads;
B. a rotatable valve member positioned in said valve chamber having generally spherical sealing surfaces, a passage which in the open position is aligned with the flow passages, and two axially aligned stems with one stem journaled in the bore of the centrally located boss and the other stem extending through and past the opening of the valve chamber;
C. a pair of seat members, one positioned between the valve member and each seat pad, each seat member comprised of an annular retainer ring encompassing a portion of the spherical sealing surfaces of the valve member and having:
(1) a frusto conical surface forming the front face opposing the valve member,
(2) an insert of resilient plastic material positioned in said frusto conical surface, said insert extending above the plane of the frusto conical surface to form the sealing face,
(3) a flat surface forming the back face opposing the seat pad,
(4) an annular groove in the generally flat surface, an annular piston positioned in said annular groove,
(5) means establishing a seal between the piston and the peripheral walls of the back face groove,
(6) means positioned between the back face groove and piston to provide initial force to force the seat member into contact with the seat pad and the spherical face of the valve member,
(7) an annular groove in the wall of the piston opposing the seat pad, an O-ring in said piston groove, the piston groove having one enlarged portion, an aperture generally centrally located in said enlarged portion communicating with the back face groove whereby when the O-ring in the groove of the piston is on either side of the aperture pressure will flow through the aperture and cause the seat member to be pressure acting;
D. a bonnet secured about the opening of the valve chamber, the bonnet having a sealed passage through which the stem extending through the opening is journaled.

7. A spherical plug valve comprising:
A. a body having:
(1) an open ended centrally located valve chamber with the wall of the chamber opposite the open end provided with a centrally located boss,
(2) a pair of axially aligned flow passages communicating with the valve chamber and terminating in parallel spaced seat pads;
B. a rotatable valve member positioned in said valve chamber having generally spherical sealing surfaces, a passage which in the open position is aligned with the flow passages, and two axially aligned stems with one stem journaled in the centrally located boss and the other stem extending through and past the opening of the valve chamber;
C. a pair of seat members, one positioned between the valve member and each seat pad, each seat member comprised of an annular retainer ring encompassing a portion of the spherical sealing surfaces of the valve member and having:
(1) a frusto conical surface forming the front face opposing the valve member,
(2) an insert of resilient plastic material positioned in said frusto conical surface, said insert extending above the plane of the frusto conical surface to form the sealing face,
(3) a flat surface forming the back face opposing the seat pad,
(4) an annular groove in the generally flat surface, an annular piston positioned in said annular groove,
(5) means establishing a seal between the piston and the peripheral walls of the back face groove,
(6) means positioned between the back face groove and piston to provide initial force to force the seat member into contact with the seat pad and the spherical face of the valve member,
(7) an annular groove in the wall of the piston opposing the seat pad, an O-ring in said piston groove, an aperture located in said groove communicating with the back face groove whereby when the O-ring in the groove of the piston is on either side of the aperture pressure will flow through the aperture and cause the seat member to be pressure acting;
D. a bonnet secured about the opening of the valve chamber, the bonnet having a sealed passage through which the stem extending through the opening is journaled.

8. A spherical plug valve comprising:
A. a body having:
(1) an open ended, centrally located valve chamber,
(2) a pair of axially aligned flow passages extending into and communicating with the central valve chamber and terminating in parallel spaced seat pads;
B. a rotatable valve member trunnioned in said valve chamber having generally spherical sealing surfaces and a passage which in the open position is aligned with the flow passages and a stem extending through and past the opening of the valve chamber;
C. a pair of annular seat members, one positioned between the valve member and each seat pad, each seat member comprised of an annular retainer ring encompassing a portion of the spherical sealing surfaces of the valve member and having:
(1) a frusto conical surface forming the front face opposing the valve member,
(2) an annular groove having its axis parallel with the axis of the seat member in the frusto conical surface,
(3) peripheral walls of said groove provided with buttress type thread serrations having the angular portions facing outward to establish a barbed effect,
(4) a pocket adjacent the top edge of the higher wall of said annular groove, said pocket being of a greater depth than the thread serrations,
(5) an insert of resilient plastic material filling said serrations and pocket in said groove and extending above the plane of the frusto conical surface, (6) a relief in the face of the resilient material forming a flat surface opposite the pocket,
(7) a flat surface forming the back face of the annular retainer ring opposing the seat pad, an annular groove in the generally flat surface,
(8) a pressure actuated piston in said back face groove,
(9) means permitting the entry of pressure between the bottom of the back face groove and piston,
(10) means establishing a seal between said annular ring and the seat pad;
D. a bonnet secured about the opening of the valve chamber, the bonnet having a sealed passage through which the stem extending through the opening is trunnioned.

9. A spherical plug valve comprising:
A. a body having:
(1) an open ended, centrally located valve chamber,
(2) a pair of axially aligned flow passages extending into and communicating with the central valve chamber and terminating in parallel spaced seat pads, each of said seat pads having a flat surface defining a plane normal to the axis of said flow passages;
B. a rotatable valve member trunnioned in said valve chamber having generally spherical sealing surfaces and a passage which in the open position is aligned with the flow passages and a stem extending through and past the opening of the valve chamber;
C. a pair of annular seat members, one positioned between the valve member and each seat pad, each seat member comprised of an annular retainer ring encompassing a portion of the spherical sealing surfaces of the valve member and having:
(1) a frusto conical surface forming the front face opposing the valve member,
(2) an annular groove having its axis parallel with the axis of the seat member in the frusto conical surface,
(3) peripheral walls of said groove provided with buttress type thread serrations having the angular portions facing outward to establish a barbed effect,
(4) an insert of resilient plastic material filling said serrations in said groove and extending above the plane of the frusto conical surface,
(5) a flat surface forming the back face of the annular retainer ring opposing the seat pad, an annular groove in the generally flat surface,
(6) a pressure actuated piston in said back face groove,
(7) means permitting the entry of pressure between the bottom of the back face groove and piston,
(8) means establishing a seal between said seat member and the seat pad;
(9) means establishing a seal between said piston and the side walls of said back face groove;
D. a bonnet secured about the opening of the valve chamber, the bonnet having a sealed passage through which the stem extending through the opening is trunnioned.

10. A spherical plug valve comprising:
A. a body having:
(1) an open ended, centrally located valve chamber,
(2) a pair of axially aligned flow passages extending into and communicating with the central valve chamber and terminating in parallel spaced seat pads;
B. a rotatable valve member trunnioned in said valve chamber having generally spherical sealing surfaces and a passage which in the open position is aligned with the flow passages and a stem extending through and past the opening of the valve chamber;
C. a pair of annular seat members, one positioned between the valve member and each seat pad, each seat member comprised of an annular retainer ring encompassing a portion of the spherical sealing surfaces of the valve member and having:
(1) a frusto conical surface forming the front face opposing the valve member,
(2) an annular groove having its axis parallel with the axis of the seat member in the frusto conical surface,
(3) peripheral walls of said groove provided with buttress type thread serrations having the angular portions facing outward to establish a barbed effect,
(4) a pocket adjacent the top edge of the higher wall of said annular groove, said pocket being of a greater depth than the thread serrations,
(5) an insert of resilient plastic material filling said serrations and pocket in said groove and extending above the plane of the frusto conical surface,
(6) a relief in the face of the resilient material forming a flat surface opposite the pocket,
(7) the face of the annular retainer ring opposing the seat pad being generally flat, an annular groove in the generally flat surface,
(8) means in said flat surface groove establishing a seal between said seat member and the seat pad;
D. a bonnet secured about the opening of the valve chamber, the bonnet having a sealed passage in which the stem extending through the opening is journaled.

11. A spherical plug valve comprised of a body member having a valve chamber with at least one seat pad, a spherical valve member in said valve chamber, a seat member formed of an annular retainer ring adapted to encompass a portion of the spherical sealing surfaces of the valve member comprising:
A. the side of the retainer ring facing the valve member having a frusto conical surface,
B. an annular groove having its axis parallel with the axis of the seat member in the frusto conical surface,
C. peripheral walls of said groove provided with buttress type thread serrations having the angular portions facing outward to establish a barbed effect,
D. a pocket adjacent the top edge of the higher wall of a greater depth than the thread serrations,
E. an insert of resilient plastic material filling said serrations and pocket in said groove and extending above the plane of the frusto conical surface,
F. a relief in the face of the resilient material forming a flat surface opposite the pocket,
G. a flat surface forming the back face of the annular retainer ring, an annular groove in the generally flat surface, an annular piston in the annular groove in the generally flat surface,
H. grooves in the inner and outer peripheral walls of the back face groove, an O-ring positioned in each of said peripheral wall grooves to establish a seal between the piston and the peripheral walls of the back face groove,
I. a multiplicity of blind holes in the bottom wall of the back face groove, springs positioned in said blind holes adapted to provide resilience to the seat,
J. an annular groove in the wall of the piston opposing the seat pad, an O-ring in said piston groove, the piston groove having one enlarged portion, an aperture generally centrally located in said enlarged portion, a bushing in said aperture, said bushing extending above the face of the bottom wall of the piston groove and having a passage communicating with the annular groove in the flat face of the seat member whereby when the O-ring in the groove of the piston is on one side of the bushing pressure will flow through the aperture and cause the seat member to be pressure acting, but when the pressure exceeds certain limits the O-ring will move atop the bushing and permit pressure to escape.

12. A spherical plug valve comprised of a body member provided with a valve chamber having at least one seat pad, a spherical valve member in said valve chamber, a seat member formed of an annular retainer ring adapted to encompass a portion of the spherical sealing surfaces of the valve member comprising:
   A. the side of the retainer ring facing the valve member having a frusto conical surface,
   B. an annular groove having its axis parallel with the axis of the seat member in the frusto conical surface,
   C. peripheral walls of said groove provided with buttress type thread serrations having the angular portions facing outward to establish a barbed effect,
   D. a pocket adjacent the top edge of the higher wall of a greater depth than the thread serrations,
   E. an insert of resilient plastic material filling said serrations and pocket in said groove and extending above the plane of the frusto conical surface,
   F. a relief in the face of the resilient material forming a flat surface opposite the pocket,
   G. a flat surface forming the back face of the annular retainer ring, an annular groove in the generally flat surface, a piston in said annular groove in the generally flat surface,
   H. means establishing a seal between the piston and the peripheral walls of the back face groove,
   I. spring means between the bottom wall of the back face groove and piston to provide resiliency to the seat,
   J. an annular groove in the wall of the piston opposing the seat pad, an O-ring in said piston groove, the piston groove having one enlarged portion, an aperture generally centrally located in said enlarged portion, a bushing in said aperture, said bushing extending above the face of the bottom wall of the piston groove and having a passage communicating with the annular groove in the flat face of the seat member whereby when the O-ring in the groove of the piston is on one side of the bushing pressure will flow through the aperture and cause the seat member to be pressure acting, but when the pressure exceeds certain limits the O-ring will move atop the bushing and permit pressure to escape.

13. A spherical plug valve comprised of a body member provided with a valve chamber having at least one seat pad, a spherical valve member in said valve chamber, a seat member formed of an annular retainer ring adapted to encompass a portion of the spherical sealing surfaces of the valve member comprising:
   A. the side of the retainer ring facing the valve member having a frusto conical surface,
   B. an annular groove having its axis parallel with the axis of the seat member in the frusto conical surface,
   C. peripheral walls of said groove provided with buttress type thread serrations having the angular portions facing outward to establish a barbed effect,
   D. an insert of resilient plastic material filling said serrations in said groove and extending above the plane of the frusto conical surface,
   E. a flat surface forming the back face of the annular retainer ring, an annular groove in the generally flat surface, a piston in said annular groove in the generall flat surface,
   F. means establishing a seal between the piston and the peripheral walls of the back face groove,
   G. spring means between the bottom wall of the back face groove and piston to provide resiliency to the seat,
   H. an annular groove in the wall of the piston opposing the seat pad, an O-ring in said piston groove, the piston groove having one enlarged portion, an aperture generally centrally located in said enlarged portion, a bushing in said aperture, said bushing extending above the face of the bottom wall of the piston groove and having a passage communicating with the annular groove in the flat face of the seat member whereby when the O-ring in the groove of the piston is on one side of the bushing pressure will flow through the aperture and cause the seat member to be pressure acting, but when the pressure exceeds certain limits the O-ring will move atop the bushing and permit pressure to escape.

14. A spherical plug valve comprised of a body member provided with a valve chamber having at least one seat pad, a spherical valve member in said valve chamber, a seat member formed of an annular retainer ring adapted to encompass a portion of the spherical sealing surfaces of the valve member comprising:
   A. the side of the retainer ring facing the valve member having a frusto conical surface,
   B. an annular groove having its axis parallel with the axis of the seat member in the frusto conical surface,
   C. peripheral walls of said groove provided with buttress type thread serrations having the angular portions facing outward to establish a barbed effect,
   D. an insert of resilient plastic material filling said serrations in said groove and extending above the plane of the frusto conical surface,
   E. a flat surface forming the back face of the annular retainer ring, an annular groove in the generally flat surface, a piston in said annular groove in the generally flat surface,
   F. means establishing a seal between the piston and the peripheral walls of the back face groove,
   G. spring means between the bottom wall of the back face groove and piston to provide resiliency to the seat,
   H. an annular groove in the wall of the piston opposing the seat pad, an O-ring in said piston groove, the piston groove having an aperture communicating with the annular groove in the flat face of the seat member whereby when the O-ring in the groove of the piston is on one side of the bushing pressure will flow through the aperture and cause the seat member to be pressure acting.

15. A spherical plug valve comprising:
A. a body having an open ended centrally located valve chamber and a pair of axially aligned flow passages communicating with the central valve chamber and terminating in parallel spaced seat pads;
B. a rotatable valve member trunnioned in said valve chamber having generally spherical sealing surfaces, a passage which in the open position is aligned with the flow passages, and a stem extending through and past the opening of the valve chamber;
C. a pair of pressure actuated seat members, one positioned between the valve member and each seat pad, each seat member comprised of:
   (1) an annular ring encompassing a portion of the spherical sealing surfaces of the valve member, the face of the ring opposing the valve member having a plastic insert which forms the sealing area with the spherical surface of the valve member,
   (2) a back surface having an O-ring forming a seal with the seat pad,
   (3) piston means which when acted upon by pressure will cause the axial length of the seat to expand causing the face of the seat to more tightly contact the spherical surface of the valve member and the back surface to more tightly contact the seat pad;
D. a bonnet secured about the opening of the valve chamber, the bonnet having a sealed passage in which the stem extending through the opening is journaled.

16. A spherical plug valve comprising:
A. a body having an open ended centrally located valve chamber and a pair of axially aligned flow passages communicating with the central valve chamber and terminating in parallel spaced seat pads;
B. a rotatable valve member trunnioned in said valve chamber having generally spherical sealing surfaces, a passage which in the open position is aligned with the flow passages, and a stem extending through and past the opening of the valve chamber;
C. a pair of pressure actuated seat members, one positioned between the valve member and each seat pad, each seat member comprised of:
   (1) an annular ring encompassing a portion of the spherical sealing surfaces of the valve member, the face of the ring opposing the valve member having a plastic insert which forms the sealing area with the spherical surface of the valve member,
   (2) a back surface forming a seal with the seat pad,
   (3) piston means which when acted upon by pressure will cause the axial length of the seat to expand causing the face of the seat to more tightly contact the spherical surface of the valve member and the back surface to more tightly contact the seat pad;
D. a bonnet secured about the opening of the valve chamber, the bonnet having a sealed passage in which the stem extending through the opening is journaled.

References Cited in the file of this patent

UNITED STATES PATENTS

| | | |
|---|---|---|
| 2,235,307 | Atkinson | Mar. 18, 1941 |
| 2,376,388 | Saunders | May 22, 1945 |
| 2,796,230 | Grove | June 18, 1957 |
| 2,832,561 | Holl | Apr. 29, 1958 |
| 2,868,498 | Kaiser | Jan. 13, 1959 |
| 2,919,886 | Hurst | Jan. 5, 1960 |
| 2,963,261 | Holl | Dec. 6, 1960 |
| 2,963,262 | Shafer | Dec. 6, 1960 |
| 3,006,599 | Eckert | Oct. 31, 1961 |

FOREIGN PATENTS

| | | |
|---|---|---|
| 865,788 | Great Britain | Apr. 19, 1961 |